Figure 1:
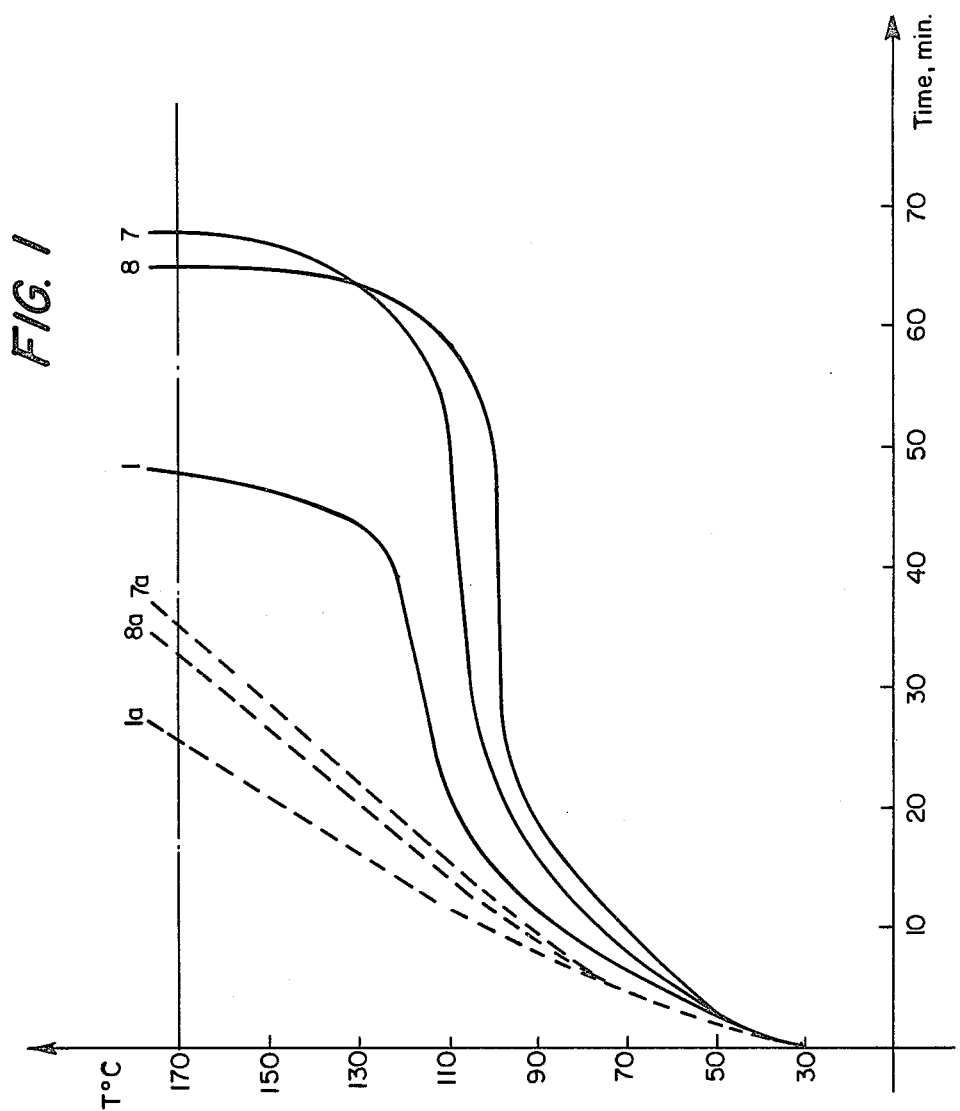

United States Patent [19]

Raevsky et al.

[11] Patent Number: 4,462,831

[45] Date of Patent: Jul. 31, 1984

[54] FIRE AND HEAT PROTECTION MATERIAL OF ABLATIVE TYPE

[75] Inventors: Vitaly Raevsky; Gregory Svechinsky, both of Haifa, Israel

[73] Assignee: Raspik Ltd., Kiryat-Ata, Israel

[21] Appl. No.: 402,324

[22] Filed: Jul. 27, 1982

Related U.S. Application Data

[63] Continuation-in-part of Ser. No. 165,980, Jul. 7, 1980, abandoned.

[51] Int. Cl.³ .............................................. C09K 3/28
[52] U.S. Cl. .................... 106/18.26; 252/606; 428/242; 428/245; 428/256; 428/263; 428/268; 428/271; 428/273; 428/290; 428/291; 428/702; 428/920; 523/179
[58] Field of Search ............... 428/245, 256, 268, 271, 428/273, 290, 291, 920, 242, 263, 702; 106/18.26; 252/606; 523/179

[56] References Cited

U.S. PATENT DOCUMENTS

| | | | |
|---|---|---|---|
| 2,132,969 | 10/1938 | Rau | 521/101 |
| 3,714,084 | 1/1973 | Botz . | |
| 4,034,079 | 7/1977 | Schoonman | 424/83 |
| 4,122,059 | 10/1978 | Hansen . | |
| 4,166,743 | 9/1979 | Wortmann et al. | 252/606 |
| 4,209,335 | 6/1980 | Katayama et al. | 106/89 |
| 4,247,332 | 1/1981 | Kinoshita et al. | 106/18.16 |
| 4,374,171 | 2/1983 | McCarter | 428/920 |

OTHER PUBLICATIONS

Chemical Abstracts, 74:15503.
Chemical Abstracts, 92:95113.
Chemical Abstracts, 93:133410.
Chemical Abstracts, 93:172636.
Chemical Abstracts, 94:35414.

*Primary Examiner*—James C. Cannon
*Attorney, Agent, or Firm*—John S. Roberts, Jr.

[57] ABSTRACT

The present invention relates to a fire and heat protection material of ablative type. According to the invention an organic binder is mixed with a filler consisting of hydrated aluminum sulfate of the general formula $Al_2(SO_4)_3 \cdot nH_2O$ (wherein $n=14-18$) being present in amounts of more than 65% by wt of the mixture.

The fire and heat protection material can be produced in the form of hard sheets, tapes, films, putties or paints, the time of heat protection being even more than 90 minutes.

The material can be used for coating fuel tanks and particularly for protection of stationary stores of explosives and ammunition.

6 Claims, 2 Drawing Figures

FIRE AND HEAT PROTECTION MATERIAL OF ABLATIVE TYPE

This is a continuation in part of the Ser. No. 165,980 filed on July 7, 1980, now abandoned.

The object of the present invention is a new fire and heat protection material for one time use, of the so called ablative type. The basic task of materials of the above mentioned type is to bar penetration of intense heat for a maximum period of time.

Combustible, explosive and other materials, buildings and structures, requiring protection from the effect of high temperatures and open flames may be either coated with a layer of fire and heat protection material or disposed within rooms, receptacles, cases and boxes made from the above mentioned material or coated by it.

This protects the materials in question from catching fire or from exploding in case of a fire.

The above mentioned fire and heat protection material are for one-time use and can be used coating stationary receptacles containing fuel and combustible substances (crude oil, petrol, gasoil, etc.), as well as for coating fuel tanks of means of transportation: planes, helicopters, cars, tanks, launches and ships, etc. It can also be used for protection of stationary stores of explosives and ammunition, as well as for protection of ammunition carried by planes, helicopters, ships, launches, tanks etc. for manufacturing safes, lockers, warehouses, storerooms for museum exhibits, collections, etc.

The fire and heat protection material can also be used to protect the load carrying structural members of various buildings, partitions, walls, doors etc. which are likely to be destroyed through loss of strength in case of fire, for example the steel structure of high-rise buildings, aluminum structures etc.

The examples quoted above do not of course exhaust all possible applications of the above mentioned fire and heat protection material.

The basic shortcomings of existing heat protection materials of ablative type are as follows:

(a) Short time of protection. This is a basic property of the material. To the best of our knowledge, the best material existing today have a time of protection of no more than 30 to 45 minutes for a layer of 10 mm. Time of protection of this order is considered too low for most of the cases. (The method for determining time of protection will be later described and illustrated in FIG. 2 attached to this specification).

(b) Each material has a limited variety of possible applications. It can be made either into a cover, or only into a coat of paint, or used as a putty only etc. A very limited number materials lend themselves to several of the uses indicated.

(c) Very few materials are of any structural use, i.e. have enough strength to allow structural elements and parts to be manufactured from them. Few of them are easily machined.

(d) The majority of existing heat protection materials emit toxic, smokes, gases and vapours when burning.

The material according to the present invention has an exceptionally long time of heat protection, twice as long as that afforded by the best samples of known materials. Its time of heat protection is about 90 to 100 minutes, compared to 30 to 45 minutes for the known materials. The material can be produced as a plastic suitable for structural use, various articles, structures, partitions, receptacles, cases etc. can be easily manufactured from it. It allows a broad spectrum of uses; thus it can be made into a hard or a soft covering an insulation, a paint, a putty or into a high-strength structural material. It can also be reinforced by any materials.

The present invention consists of a fire- and heat protection material of one time use, comprising an organic binder and a filler consisting of hydrated aluminium sulfate of the general formula $Al_2(SO_4)_3 \cdot nH_2O$, wherein $n = 14-18$ in amounts of more than 65% by weight of the mixture.

Before describing in full the present invention a short review of prior art, either by its relevancy to the use of some of the components as utilized in the present invention in the starting reagents obtaining fire retardants, or in respect to obtaining of a surface with athermanous insulating layer, which might also be considered to posses leavening action. Thus, according to U.S. Pat. No. 4,122,059, mixture of fire resistant materials based on hydraulic cement are suggested, its compositions containing either aluminum sulfate hydrate or ferrous sulfate hydrate. As pointed out in said patent, as the cement sets, water from the hydrate "is driven off into contact with the cement" producing a substance which refracts fire. The skeleton and basis of the composition is a hydraulic cement, which is an ingredient necessary to form a non-combustible, self-extinguishing article. As explained in the patent "the cement acts as a moisture stabilizer picking up the water released from the hydrate and converting the mass to a concrete" (Column 2, lines 11-13). According to this patent, a number of inorganic salt hydrates such as aluminum sulfate or ferrous sulfate are suggested. The amount of hydrate preferred is between 25-60%, although all the examples use less than 50%. The product obtained is a fire retardant material, the essence of which is the stability at high temperature. This property is contrary to the material obtained according to the present invention, which has a goal to protect against fire and heat by decomposing when exposed to fire or sufficient high heat. The composition according to the present invention, prevents heat penetration at lower temperatures by absorbing the heat through the water evaporation process. Therefore, there is a basic difference between the material described in said patent which is a fire retardant and should be stable at high temperature, and the material described in the present invention which is a heat conductor preventing heat penetration through the material being decomposed at high temperatures, their combustibility being of no importance. The behaviour of the water of hydration is also completely different: according to said patent, the water should be retained to high temperatures of the order of 800° F. or above (Column 1, lines 67-68) and are released very slowly, reducing the amount of water lost through evaporation (the patent terms this property as "locked"). According to the present invention, the water of hydration is released at 176°–194° F. (80°–90° C.), the heat consumption required for evaporation of said water providing heat protective properties to the material coated with the composition.

According to U.S. Pat. No. 4,209,335 a method for purification of waste material is suggested using compositions containing cement and another constituent selected from a number of additives which include also aluminum sulfate. As mentioned in said patent (Column 1 line 66 through Column 2 line 11) the method is based on the use of aluminum sulfate as an additive to the hydration reaction of cement, which enhances the consolidation effect thus increasing the strength of the cement composition.

According to U.S. Pat. No. 4,247,332 a flame retarder wood treatment composition having an anti-blooming property is described. Although aluminum-containing inorganic salts are mentioned as possible agents employed in the treatment, the list does not specify aluminum sulfate hydrate. As illustrated in the experimental part of the present specification, some of the additives mentioned in said patent were tested and poor results only were obtained (see for example the results obtained with alum salt of ammonium-aluminum sulfate type). The amount of additive suggested in said patent is below 50%. The crucial difference between this patent and the present invention consists in the utilities of the two products according to said patent, the product is a fire retardant, while according to the present invention it is a heat protection material. The fire retardant property is imparted by the known flame extinguishing atoms such as Br, P, B etc.

According to Chemical Abstracts 93, 172636 a thermal insulating material is described which comprises aluminum ammonium sulfate hydrate. As shown in the experimental part of the present specification, when aluminum sulfate hydrate was replaced by the reagent described in said reference poor results were obtained. Said reference does not even mention hydrated aluminum sulfate per se.

According to Chemical Abstracts 93, 133410, a quick-lime-aluminum sulfate additive is used to accelerate the manufacture of cellular plastic materials. The amount of aluminum sulfate hydrate is much less than 30% by weight.

According to Chemical Abstracts 92, 95118 is described the manufacture of a fire-resistant resin which incorporates potassium aluminum ammonium sulfate feldspar as one of the ingredients of a composition, coated on a glass fiber mat. Again, this reference does not mention anything in respect to heat protective properties.

According to U.S. Pat. No. 2,132,969, a method is described for the manufacture of a surface with athermanous insulating layer of a cellular substance based on asphalts, bitumens, phenol-formaldehyde resin (bakelite) and natural resins (rosins) as binders in a vaporizable solvent. Reagents suggested as possessing leavening actions are various hydrated salts, urea and ammonium carbonate. Hydrated aluminum sulfate is also mentioned in Table II of said patent as foaming agent in the amount of from 5% to 20%. As appears from the comparative Examples given in the present specification, the method failed when applied to obtain a heat protection effect, relatively low heat protection time being obtained. As particularly pointed out in Claim 3 of said patent (Column 5 lines 24–25) the leavening agent "has substantially complete gas-emitting decomposition" or in other words all the hydration water seems that were expelled from the mass and therefore the aluminum sulfate is present in its anhydrous form. This fact is also supported from Table II which specifies that the volume of gas per molecule of $Al_2(SO_4)_3.18H_2O$ is 18 corresponds to the 18 molecules of water. There is also a basic difference between the product obtained according to said patent and the present invention: according to said patent, the product may be utilized as building wall, automobile body, ice-box refrigeration, machinery insulation (page 5, line 44+ of Column 1), while according to the present invention, the product is for one time use in the heat protection for even more than 90 minutes.

The distinctive characteristic of the material to the present invention as opposed to other materials made for the same purpose is that it is based on some types of polymer binders with the hydrated aluminum sulfate incorporated as a filler. It was most surprisingly found that only the hydrated aluminum sulfate having between 14 to 18 molecules of water, produces the long protection time of even more than 90 minutes, compared with other known hydrated salts. Moreover, as will be shown in the experimental part, comparative Examples carried out with hydrated double salt of aluminum sulfate and ammonium sulfate, gave low protection time in the order of only 30 minutes.

FIG. 1 is a comparison of the duration of heat protection at various temperatures provided by samples containing 50% $Al_2(SO_4)_3.16H_2O$ and samples containing between 68% and 85% $Al_2(SO_4)_3.16H_2O$.

Figure 2:
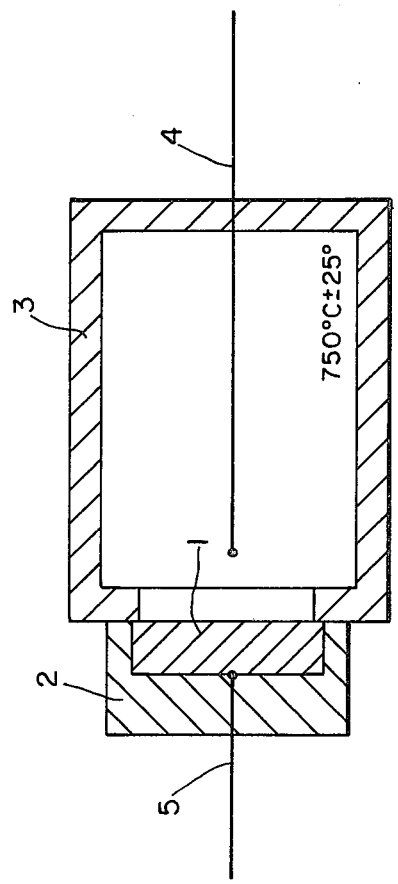

FIG. 2 shows the equipment used to test the fire protection duration of the products of the invention.

The amount of hydrated aluminum sulfate to be utilized in order to obtain long protection time is very critical, amounts of above 65% by weight being required in order to obtain the desired long protection time of above 90 minutes. When lower amounts of hydrated aluminum sulfate were utilized, only poor results were obtained, as appear from the experiments presented. This also appears in the attached FIG. 1, when several graphs are presented illustrating some experiments on specimens of 8 mm thickness from materials prepared with amounts of $Al_2(SO_4)_3.16H_2O$ above 65% by weight, comparing with corresponding experiments 1a, 7a and 8a carried out under the same conditions but in all of them using only 50% by wt. $Al_2(SO_4)_3.16H_2O$; it can be noticed that in all experiments with $Al_2(SO_4)_3.16H_2O$, the heat protection time was only between 28–35 minutes compared with 48–67 minutes when the amount of $Al_2(SO_4)_3.16H_2O$ was between 68% to 85%. It is in particular important to observe the plateau which exists in experiments 1, 7 and 8 compared with the linear graphs in experiments 1a, 7a and 8a. This clearly indicates the existance of a qualitative change and not only quantitative change imparted to the material caused by the increase of the quantity of the hydrated aluminum sulfate. As appears the length of said plateau is about 30 to 45% from the total fire and resistance time, which is a most desirable effect.

The inventors have found that no fire- and heat protection effect is attained at all if the amount of hydrated aluminum sulfate introduced is below 30% by weight. The inventors could not find a theoretical explanation why the increase of hydrated aluminum sulfate content beyond 65% by weight brings about principle changes in the characteristics of the material, namely, in the new property of an exceptionally effective fire and heat protection.

The gist of the present invention is as follows:
(1) Fire and heat protection material based on organic natural and synthetic compounds (polymers, caouthucs and rubbers, oligomers and resins) as binders together with hydrated aluminum sulfate, having a distinctive feature, which lies in the fact that in order to provide for fire and heat protection properties, hydrated aluminum sulfate has to be introduced in amounts of more than 65% by weight of the mixture and most preferably about 75% by wt.

(2) Hydrated aluminum sulfate $Al_2(SO_4)_3 \cdot nH_2O$, wherein $n=14-18$ is utilized. This formula is true for the chemically pure form of hydrated aluminum sulfate, whereas the industrial product has $n=14-16$ (i.e. 17% to 18% of $Al_2O_3$). Obviously, the use of chemically pure products in the present invention is economically not justified because of high prices of said products, especially as the heat protection time in case of chemically pure and industrial products is the same. For this reason $Al_2(SO_4)_3 \cdot 16H_2O$ is given in the present invention.

Among the advantages of the fire and heat protection materials according to the present invention, it should be mentioned the fact that they do not contain any toxic products and on being exposed to high temperatures or flame they do not give off any toxic combustion and decomposition products.

Thus the present invention is for fire and heat protection materials based on organic binders with hydrated aluminum sulfate as fillers, having also a distinctive feature that in order to cut costs drastically, said materials comprising technically aluminum sulfate. Sometimes, when a stronger heat protective sheet is desired a mixture of two or more binders may be selected.

In principle, the use of aluminum sulfate in the manufacture of fire protection materials is known with strongly basic compounds e.g. $NaHCO_3$ and salts of strong acids. It should be stressed the fact that, it is just suggested $Al_2(SO_4)_3$, i.e. common aluminum sulfate, while according to the present invention it is utilized hydrated aluminum sulfate $Al_2(SO_4)_3 \cdot (14-18)H_2O$. Mixtures of $Al_2(SO_4)_3$ and $NaHCO_3$ tested in a similar manner show that a heat protection time in the range of 15-20 minutes were obtained. The exact mechanism which could explain the poor results of these mixtures was not yet elucidated.

Hydrated aluminum sulfate and aluminum sulfate are obsolutely different compounds (see Table 1) and hence the use of the common aluminum sulfate does not give the same results as hydrated aluminum sulfate.

TABLE 1

Aluminum sulphate and hydrated aluminum sulphate comparative characteristics.

| Characteristics | Aluminum sulphate | Hydrated aluminum sulphate |
|---|---|---|
| Chemical formula | $Al_2(SO_4)_3$ | $Al_2(SO_4)_3 18 H_2O$ |
| Molecular weight | 342.15 | 666.42 |
| Colour | white | colourless |
| Crystal form refractive index | non-transparent powder | monocrystals 1.48 |
| Density, gr/cm$^3$ | 2.71 | 1.69 |
| Decomposition point, °C. | 770 | 86.5 |
| Solubility is hot water (gr per 100 gr of water) | 89 | unlimited |

In FIG. 2, it is presented in a schematic manner the equipment utilized in the tests for determining the fire protection time, which characterizes the products obtained according to the present invention. Test specimen (1) in the form of a plate, generally having a thickness in the range of between 5-15 mm was placed in a muffle furnace (3) located in a recess at its door. The furnace door was heat insulated (2) preventing heat from being removed from the specimen. During the test, the muffle furnace was heated up to $750 \pm 25°$ C., controlled by a thermocouple (4). The heating of the specimen started from the furnace side. The temperature of the specimen, was measured on its rear side by the thermocouple (5). The time of heating the specimen, on the rear side, up to 120° C. and 170° C. was measured being nominated as fire protection time.

The present invention also provides a method for the manufacture of fire- and heat protection materials. According to one embodiment, all the ingredients including the polymer, resin or any other binder, hardener and the hydrated aluminum sulfate are mixed together until a homogeneous mass is obtained. The mass is obtained with the aluminum sulfate embedded into the matrix of the binder.

According to another embodiment, it is possible to prepare first the resin in its polymerized form and after that to add the hydrated aluminum sulfate at the required proportion.

The fire and heat protection materials according to the present invention may also be strengthened by incorporating glass fibers, asbestos fibers or any textile fabric or even metal wire. Of course it can also be envisaged to produce composites of two or more layers in the form of sandwiches.

According to still another embodiment it is possible to utilize a solution of aluminum sulfate, so that the hydrated salt will be formed in its required form by a controlled heating step, embedded into the matrix of the binder. Another approach is to prepare the aluminum sulfate in-situ by reacting two or more reagents which will produce the required hydrated form. A person skilled in the art after reading the present specification will select the particular embodiment without departing from the scope of this invention.

The materials may be prepared in the form of flexible plates, rigid plates or panel sections and paste. In the form of paste, it has a property of good adhesion to metals, wood, concrete etc. and after drying and hardening it would possess a high strength and sufficient elasticity.

The Examples presented hereafter are only illustrative for a better understanding of the invention without being limited thereto. The quantities given are expressed in percentage by weight unless otherwise stated. It should be pointed out that Examples 2, 3, 4, 5 (Expt 2-20) and 12 do not represent the present invention and are given only for comparative purposes.

EXAMPLE 1

$Al_2(SO_4)_3 \cdot 16H_2O$ salt—73.5% by weight as filler and unsaturated polyester resin, 22% by wt. as binder. Hardener for polyester resin was methylethyl-ketone peroxide, 2,2% by wt. and as hardening accelerator, cobalt naphthenate—2.2% by wt.

The salt was pounded into fine powder, carefully mixed with the polyester resin and the hardener and accelerator were added to the mixture while stirring. The mixture was cast in the shape of a 10 mm thick board and after hardening (30 min) tested for its heat protection properties, as described in the specification (see FIG. 2).

The time required for temperature rise from room temperature to 170° C., as shown by the thermocouple was the heat protection time. The time required to heat the opposite side of material during this test was 97 minutes.

EXAMPLE 2

AlNH$_4$(SO$_4$)$_2$.24H$_2$O was used as the filler. All other components (polyester resin, hardener, accelerator) and test conditions (thickness of board—10 mm, furnace temperature—750° C.) as set forth in Example 1. The heat protection time was 37 minutes.

EXAMPLE 3

Salt—(NH$_4$)$_2$SO$_4$.12H$_2$O all other conditions—as set forth in Example 1.
The heat protection time was 20 min.

EXAMPLE 4

The salt used as filler was AlCl$_3$.6H$_2$O all other conditions—as set forth in Example 1. The heat protection time was 16 min.

The above results show that the best results were obtained when the filler consisted of Al$^{+++}$ as cation and SO$_4{}^{--}$ as anion (Example 1)—when heat protection time resulted was 97 minutes.

When a chlorine anion was substituted for the SO$_4$ anion, the heat protection time lowered from 67 to 16 min. (Example 4).

When an ammonium cation is substituted for the aluminum cation, the heat protection time lowered from 67 to 20 min. (see Example 3).

From Example 2 it appears that even a partial substitution of ammonium for the aluminum cation, lowered the heat protection time from 97 to 37 min.

The above comparative Examples clearly show that the substitution of ion Al$^{+++}$ or ion SO$_4{}^{--}$ for any other ions results in sharp decrease of that protection time.

In Table 2 presented under the following Example 5, this conclusion will be fully proved.

EXAMPLE 5

A number of experiments were carried out, using the same binder, as in Example 1, the amount of filler being equal in all of them, but with different salts as fillers varying also the amount of water of hydration which accompany the respective salt. The results are summarized in the following Table 2.

TABLE 2

| Expt. No. | The salt used as filler | Time of heat protection (up to 170° C.) | Amount of water of hydration (% by weight) |
|---|---|---|---|
| 1. | Al$_2$(SO$_4$)$_3$·16–18 H$_2$O | 65–70 | 45.6 |
| 2. | Al NH$_4$(SO$_4$)$_2$·24 H$_2$O | 37–40 | 64 |
| 3. | K Al(SO$_4$)$_2$·12 H$_2$O | 34–37 | 46 |
| 4. | MgSO$_4$·7 H$_2$O | 30–32 | 51 |
| 5. | Al(OH$_3$) | 10 | — |
| 6. | Na$_2$SiO$_3$·9 H$_2$O | 28–32 | 57 |
| 7. | Na$_2$S·9 H$_2$O | 8 | 67 |
| 8. | Na$_2$CO$_3$·10 H$_2$O | 16 | 63 |
| 9. | Na$_2$SO$_4$·10 H$_2$O | 28–30 | 56 |
| 10. | NaAl(SO$_4$)$_2$·18 H$_2$O | 35–38 | 50 |
| 11. | Na$_3$PO$_4$·10 H$_2$O | 21 | 48 |
| 12. | ZnSO$_4$·7 H$_2$O | 29 | 44 |
| 13. | LiOH·H$_2$O | 11 | — |
| 14. | Li$_3$PO$_4$·12 H$_2$O | 20 | 65 |
| 15. | Na$_2$BO$_2$·4 H$_2$O | 20 | 52 |
| 16. | FeCl$_3$·6 H$_2$O | 27 | 40 |
| 17. | (NH$_4$)$_2$SO$_4$·12 H$_2$O | 18 | 62 |
| 18. | AlCl$_3$·6 H$_2$O | 16 | 45 |
| 19. | Na$_2$B$_4$O$_7$·10 H$_2$O | 32 | 47 |
| 20. | CaCl$_2$·6 H$_2$O | 24 | 49 |

EXAMPLE 6

Same composition as in Example 1. Before shaping the mixture is reinforced on both sides with glass cloth 0.25 mm thick. A strong structural material is obtained.
Heat protection time of a 10 mm layer—92 min.

EXAMPLE 7

Al$_2$(SO$_4$)$_3$.16H$_2$O salt—80% by wt. Rubber—20% by wt. The mixture is formed on a sheet mill and is produced in the shape of flexible sheeting, tapes, thick films, etc.
Heat protection time of a 10 mm layer—105 min.

EXAMPLE 8

The components were as follows:
Al$_2$(SO$_4$)$_3$.16H$_2$O, as filler, 78%
Urea-formaldehyde resin as binder, 21.4% and
NH$_4$Cl as hardener: 0.6%.
The heat protection for a 10 mm thickness of the sample was 95 minutes.

EXAMPLE 9

The components were as follows:
Al$_2$(SO$_4$)$_3$.16H$_2$O, as filler 85%
Polypropylene, as binder 15%.
The heat protection for a 10 mm thickness of the sample was 92 minutes.

EXAMPLE 10

The components were as follows:
Al$_2$(SO$_4$)$_3$.16H$_2$O, as filler 86%
Polyvinyl chloride, as binder 7.0%.
Dioctyl phtalate+tricresyl phosphate as plasticizers 7%.
The heat protection time for a 10 mm thickness of the sample was 95 minutes.

EXAMPLE 11

In this Example a mixture of two resins were utilized, in order to obtain a stronger plate. The binder consisted of a mixture of 70 g polyvinyl chloride and 35 g polyester. An amount of 35 g tricresyl phosphate as plasticezer was also incroporated. The filler consisted of 900 g Al$_2$(SO$_4$)$_3$.16H$_2$O. The heat protection time for a 10 mm thickness of the sample was 92 minutes.

EXAMPLE 12

Some experiments were performed using the compositions as described in the U.S. Pat. No. 4,122,059, as heat and fire protection materials:

Polyester and methyl ethyl ketone peroxide and naphtenate cobalt (together 57 parts) were mixed with 35.5 parts of Al$_2$(SO$_4$)$_3$.16H$_2$O, 3.53 parts portland cement, Fe$_2$O$_3$ 0.35 parts, MnO 1.76 parts and hydrated sodium aluminum carbonate 17.6. The heat protection time for a 10 mm specimen was only 9 minutes.

It can be concluded that good protection time is achieved only when the filler is Al$_2$(SO$_4$)$_3$.16H$_2$O. A replacement of the Al$^{+++}$ ion to any other ion, causes a sharp decrease in the heat protection time. Also, the good protection time is achieved only when the amount of the Al$_2$(SO$_4$)$_3$.16H$_2$O is above 65% by wt. Several experiments with various amounts of said filler are summarized in the following Table 3.

TABLE 3

Heat protection time for different samples with various amounts of $Al_2(SO_4)_3 \cdot 16 H_2O$.

| Experiment No. | $Al_2(SO_4)_3 \cdot 16 H_2O$ % by weight | Heat protection time of a 10 mm layer |
| --- | --- | --- |
| 1 | 73.5 | 65–70 |
| 2 | 65 | 50–55 |
| 3 | 50 | 30–35 |
| 4 | 80 | 105–110 |
| 5 | 65 | 85–90 |
| 6 | 50 | 40–45 |
| 7 | 81 | 95–100 |
| 8 | 65 | 80–85 |
| 9 | 50 | 40–45 |
| 10 | 85 | 95–100 |
| 11 | 65 | 80–85 |
| 12 | 50 | 40–45 |
| 13 | 86 | 95–100 |
| 14 | 65 | 80–85 |
| 15 | 50 | 40–45 |

We claim:

1. A non-refractory ablative, fire- and heat-protection material for one time use, comprising an organic binder selected from the group consisting of natural and synthetic polymers, rubbers, natural and synthetic resins, natural and synthetic asphalts and bitumens including latexes, solutions of the above substances or mixtures thereof, and a filler consisting of hydrated aluminum sulfate of the general formula $Al_2(SO_4)_3 \cdot nH_2O$ wherein $n = 14$–$18$ in an amount of more than 75% by weight of the material, said filler being free of any cementitious material.

2. A fire- and heat protection material as in claim 1, wherein technical grade of $Al_2(SO_4)_3 \cdot 16H_2O$ is utilized as a filler component.

3. A fire- and heat protection material as in claim 1, being reinforced with glass cloth, asbestos cloth, textile fabric or metal wire.

4. A fire- and heat protection material as in claim 3, in the form of composite of two or more layers.

5. A method for the manufacture of a fire- and heat protection material which comprises the homogeneous mixing of an organic binder selected from the group consisting of natural and synthetic polymers, rubbers, natural and synthetic resins, natural and synthetic asphalts and bitumens including latexes, solutions of the above substances and mixtures thereof and a filler free from any cementitious material consisting of hydrated aluminum sulphate of the general formula $Al_2(SO_4)_3 \cdot nH_2O$ wherein $n = 14$–$18$, said filler being in amounts of more than 75% by weight of the mixture.

6. A method for the manufacture of a fire- and heat protection material according to claim 5, wherein the organic binder is first processed to its final form and subsequently the $Al_2(SO_4)_3 \cdot nH_2O$ is incorporated.

* * * * *